United States Patent
Brown et al.

(10) Patent No.: US 11,692,582 B2
(45) Date of Patent: Jul. 4, 2023

(54) FASTENER SYSTEM

(71) Applicant: United Technologies Corporation, Farmington, CT (US)

(72) Inventors: Kevin M. Brown, Palm Beach Gardens, FL (US); Paul R. Senofonte, Jupiter, FL (US); Felix Izquierdo, Palm Beach Gardens, FL (US)

(73) Assignee: Raytheon Technologies Corporation, Farmington, CT (US)

( * ) Notice: Subject to any disclaimer, the term of this patent is extended or adjusted under 35 U.S.C. 154(b) by 1183 days.

(21) Appl. No.: 16/270,963

(22) Filed: Feb. 8, 2019

(65) Prior Publication Data
US 2020/0256371 A1   Aug. 13, 2020

(51) Int. Cl.
F16B 21/00 (2006.01)
F16B 39/10 (2006.01)
F16B 21/16 (2006.01)

(52) U.S. Cl.
CPC .............. *F16B 39/10* (2013.01); *F16B 21/16* (2013.01)

(58) Field of Classification Search
CPC ....................................................... F16B 39/10
USPC .......................... 411/996, 129, 523, 520, 511
See application file for complete search history.

(56) References Cited

U.S. PATENT DOCUMENTS

| | | | | |
|---|---|---|---|---|
| 1,495,468 A | | 5/1924 | Woerpel | |
| 2,353,795 A | * | 7/1944 | Tinnerman | F16B 5/125 248/27.3 |
| 2,409,907 A | * | 10/1946 | Shakesby | B60K 15/04 285/200 |
| 3,453,926 A | * | 7/1969 | Engelmann | F16C 11/02 411/523 |
| 4,274,754 A | * | 6/1981 | Cohen | F16B 39/04 403/14 |
| 4,288,190 A | * | 9/1981 | Benson | F16B 21/16 411/511 |
| 4,639,045 A | * | 1/1987 | Kane | B60B 7/00 301/108.4 |
| 4,735,534 A | | 4/1988 | Oehlke | |
| 4,943,013 A | * | 7/1990 | Kapala | F16B 39/10 244/54 |
| 4,953,680 A | * | 9/1990 | Flotow | F16D 13/757 192/111.6 |
| 5,253,154 A | * | 10/1993 | McMahan | B60Q 1/0686 362/523 |
| 5,297,693 A | * | 3/1994 | Perkey | F16N 21/06 220/315 |
| 5,954,466 A | | 9/1999 | Coffey | |
| 8,925,424 B1 | | 1/2015 | Jacobs | |
| 9,494,109 B2 | * | 11/2016 | Kramer | F02K 1/822 |

(Continued)

OTHER PUBLICATIONS

EP search report for EP19214607.4 dated May 6, 2020.

*Primary Examiner* — Gary W Estremsky
(74) *Attorney, Agent, or Firm* — Getz Balich LLC

(57) ABSTRACT

A fastener system for securing a component to a structure is provided. The system includes a pin portion and a clip portion. The pin portion has a head and a shaft. The clip portion has a head engagement flange and a retainer flange configured to receive a fastener that extends along a first axis. The clip portion and the pin portion are configured for engagement with one another in an engaged position, and in the engaged position the pin portion shaft extends along a second axis non-parallel to the first axis.

7 Claims, 8 Drawing Sheets

(56) References Cited

U.S. PATENT DOCUMENTS

| | | | |
|---|---|---|---|
| 2006/0043739 A1* | 3/2006 | Gogel | E05C 1/04 |
| | | | 292/148 |
| 2008/0202292 A1 | 8/2008 | Gilgallon | |
| 2010/0054894 A1* | 3/2010 | Caballero Asensio | F16B 39/10 |
| | | | 411/524 |
| 2017/0217509 A1* | 8/2017 | Skiba | B62D 43/045 |
| 2018/0340565 A1 | 11/2018 | Giannakopoulos | |

* cited by examiner

FASTENER SYSTEM

This invention was made with Government support awarded by the United States. The Government has certain rights in this invention.

BACKGROUND OF THE INVENTION

1. Technical Field

This disclosure relates generally to fastener systems, and to fastener systems having retention and anti-rotation features in particular.

2. Background Information

In some applications, a component mounted within an environment (e.g., a gas turbine engine) may require occasional removal and repair or replacement (an "R&R procedure"). In some instances, it is critical that the fastener system used to secure the component be configured so it can be retained or accounted for during the R&R procedure. Under certain circumstances, a displaced fastener can present a potential threat of damage within the machinery if not retrieved. To avoid such damage it may be necessary to disassemble the machinery to locate and remove the displaced fastener prior to returning the machinery to operation. In a gas turbine engine environment, it also may necessary to remove the engine from the air frame prior to disassembly. In addition, in some environments component mounting hardware (e.g., pins, etc.) can be subject to undesirable wear if allowed to freely rotate. In extreme instances, the undesirable wear due to rotation can compromise the component mounting hardware.

What is needed is a fastener system that decreases the potential for a displaced fastener or portion thereof, and one that mitigates the possibility of mounting hardware wear attributable to rotation during use.

SUMMARY

According to a first aspect of the present disclosure, a fastener system for securing a component to a structure is provided. The system includes a pin portion and a clip portion. The pin portion has a head and a shaft. The clip portion has a head engagement flange and a retainer flange configured to receive a fastener that extends along a first axis. The clip portion and the pin portion are configured for engagement with one another in an engaged position, and in the engaged position the pin portion shaft extends along a second axis non-parallel to the first axis.

According to another aspect of the present disclosure, a mounting system for attaching a component to a structure is provided. The structure has a first portion and a second portion that extends outwardly from the first portion. The mounting system includes at least one fastener system that has a pin portion and a clip portion. The pin portion has a head and a shaft. The clip portion has a head engagement flange and a retainer flange configured to receive the fastener. The clip portion and the pin portion are configured for mounting on the structure in an engaged position. In the engaged position, the fastener secures the retainer flange to the second portion of the structure, and extends along a first axis, and the pin portion shaft is received within the first portion of the structure and extends along a second axis non-parallel with the first axis, and wherein the pin portion is restrained from rotation by the clip portion.

In any of the aspects or embodiments described above and herein, in the engaged position the pin portion shaft may extends along a second axis substantially perpendicular to the first axis.

In any of the aspects or embodiments described above and herein, the clip portion may further include a connecting member with a first lengthwise end and a distal second lengthwise end, and the head engagement flange may be attached to the connecting member adjacent the first lengthwise end and the retainer flange may be attached to the connecting member adjacent the second lengthwise end. The head engagement flange may extend laterally outward from the connecting member, and the retainer flange may extend laterally outward from the connecting member.

In any of the aspects or embodiments described above and herein, the pin portion head and the head engagement flange may be configured to mate with one another in a manner that prevents relative rotation in the engaged position.

In any of the aspects or embodiments described above and herein, the clip portion and the pin portion may be configurable in a non-engaged position, wherein the clip portion is rotatable from a first position in the engaged position to a second position in the non-engaged position, and in the non-engaged position the pin portion may be unrestrained by the clip portion.

In any of the aspects or embodiments described above and herein, the head engagement flange may include a first finger portion, a second finger portion, and a pin slot that extends lengthwise between a first end and a second end. The pin slot is disposed between the first finger portion and the second finger portion.

In any of the aspects or embodiments described above and herein, the head of the pin portion may include a first clip slot disposed on a first side of the head, and a second clip slot disposed on a second side of the head, opposite the first side. In the engaged position, at least a portion of the first finger may be received within the first clip slot and at least a portion of the second finger may be received within the second clip slot. The first finger and second finger respectively may cooperate with the first clip slot and the second clip slot to prevent relative rotation between the pin portion and the clip portion in the engaged position.

In any of the aspects or embodiments described above and herein, the retainer flange head may be disposed at a lengthwise end of the head engagement flange adjacent the second end of the pin slot, and the retainer flange may extend laterally outward from the head engagement flange.

In any of the aspects or embodiments described above and herein, the retainer flange may extend laterally outward in a direction that is substantially perpendicular to the length of the head engagement member.

In any of the aspects or embodiments described above and herein, the first finger and the second finger may be configured to retain the pin portion within the pin slot.

In any of the aspects or embodiments described above and herein, a cap element may be attached to the first finger and the second finger at the first end of the pin slot.

In any of the aspects or embodiments described above and herein, the first finger and the second finger may be configured to engage with an obstructing fastener.

In any of the aspects or embodiments described above and herein, the head engagement flange may include a finger, and the pin portion may include an aperture that extends through head, the aperture configured to receive the finger, and in the engaged position the finger may extends through the aperture.

In any of the aspects or embodiments described above and herein, the head engagement flange is configured relative to the first portion of the structure that prevents rotation of the clip member relative to the first portion of the structure in the engaged position.

The present method and advantages associated therewith will become more readily apparent in view of the detailed description provided below, including the accompanying drawings.

DETAILED DESCRIPTION

Figure 1:
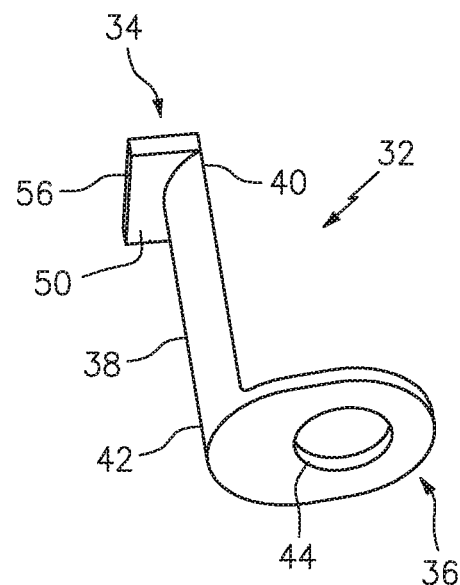
FIG. 1 is a diagrammatic illustration of a clip portion embodiment.

The present disclosure is directed to a fastener system 30 (e.g., see FIGS. 5-11 and 15-21) configured for retention and anti-rotation. The fastener system 30 is typically used to secure or mount a component to a structure. The fastener system 30 include a pin portion and a clip portion. When the fastener system 30 is installed, the clip portion is configured to retain the pin portion and to prevent the pin portion from rotating after installation.

Referring to FIGS. 1-11, in a first embodiment of the present disclosure fastener system 30 the clip portion 32 includes a head engagement flange 34, a retainer flange 36, and a lengthwise extending connecting member 38. The head engagement flange 34 may be disposed at a first lengthwise end 40 of the connecting member 38, and may extend outwardly from the connecting member 38 in a first lateral direction. The retainer flange 36 may be disposed at a second lengthwise end 42 of the connecting member 38 (opposite the first lengthwise end 40), and may extend outwardly from the connecting member 38 in a second lateral direction. In the embodiment shown in FIG. 1, the head engagement flange 34 and the retainer flange 36 extend outwardly in opposite lateral directions, and are substantially perpendicular to the lengthwise axis of the connecting member 38. The present disclosure is not, however, limited to this particular configuration; e.g., in an alternative configuration, one or both of the head engagement flange 34 may be in a non-parallel orientation relative to the lengthwise axis of the connecting member 38 other than perpendicular. The retainer flange 36 is configured for attachment to a structure; e.g., the retainer flange 36 may include an aperture 44 configured to receive a fastener 46 for securing the clip portion 32 to the structure. The aperture 44 is configured to receive a fastener 46 that extends along an axis; e.g., an axis that is substantially parallel to the length of the connecting member 38. As will be described in more detail below, the head engagement flange 34 is configured to mate with a pin portion 48 such that when the fastener system 30 is installed, the head engagement flange 34 engages the pin portion 48 and prevents rotational movement of the pin portion 48. In the clip portion 32 embodiment shown in FIG. 1, the head engagement flange 34 includes a first surface 50 that is configured to mate with a surface 52 of the pin portion head 54, and a second surface 56 that is configured to engage the structure.

Figure 2:
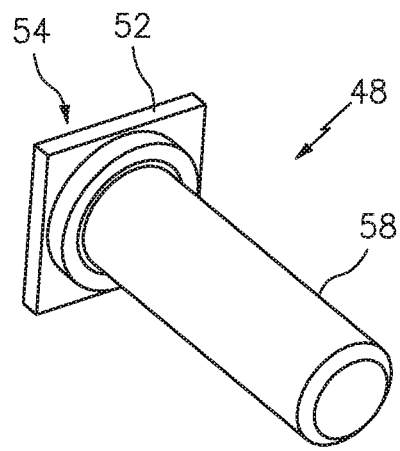
FIG. 2 is a diagrammatic illustration of a pin portion embodiment.

The pin portion 48 embodiment shown in FIG. 2 includes a head 54 disposed at an end of a shaft 58. The shaft 58 is configured for engagement with a component 60 (or hardware attached thereto); e.g., for purposes of directly or indirectly mounting the component 60 to the structure. In FIG. 2 the shaft 58 is shown as a cylindrical shaft, but the present disclosure is not limited to a shaft 58 having a cylindrical configuration. The pin portion head 54 is configured to mate with the head engagement flange 34 such that when the fastener system 30 is installed, the respective geometries of the pin portion head 54 and head engagement flange 34 prevent rotational movement of the pin portion 48. In the embodiment shown in FIG. 2, the pin portion head 54 includes a surface 52 that is configured to mate with a first surface 50 of the head engagement flange 34; e.g., the head surface 52 and the first surface 50 are both planar surfaces that prevent relative rotation. The present disclosure is not limited to the rectangular head 54 configuration shown in FIG. 2.

Figure 3:
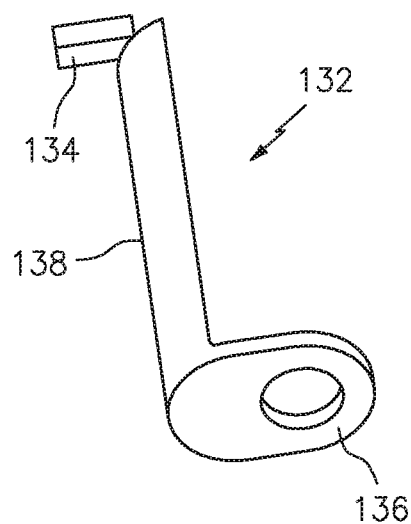
FIG. 3 is a diagrammatic illustration of a clip portion embodiment.
Figure 4:
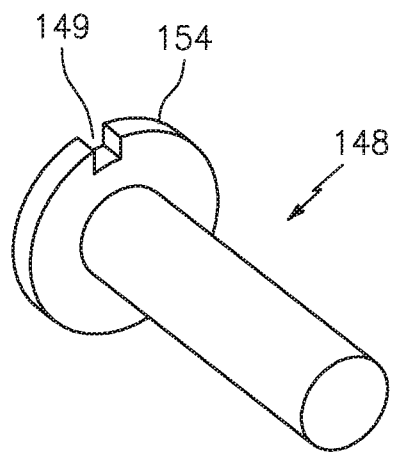
FIG. 4 is a diagrammatic illustration of a pin portion embodiment.

FIGS. 3 and 4 show an alternative embodiment of the fastener system 30. In this embodiment, the clip portion 132 (see FIG. 3) also includes a head engagement flange 134, a retainer flange 136, and a lengthwise extending connecting member 138, and the head engagement flange 134 is configured to mate with the pin portion 148 such that when the fastener system 30 is installed, the head engagement flange 134 engages the pin portion 148 and substantially (or completely) prevents rotational movement of the pin portion 148. In this embodiment, however, the head engagement flange 134 forms a male portion of a mating male/female couple that when engaged with the head 154 of the pin portion 148 prevents relative rotation. The pin portion 148 embodiment shown in FIG. 4 illustrates an example of a female portion of the aforesaid male/female portion (e.g., a slot 149) that is configured to receive the male portion (i.e., the head engagement flange 134).

The present disclosure is not limited to the fastener system 30 embodiments shown in FIGS. 1-4. Rather, these embodiments are provided to illustrate examples of a fastener system 30 having a clip portion 32, 132 and a pin portion 48, 148, wherein when the fastener system 30 is installed, the head engagement flange 34, 134 engages the pin portion 48, 148 and prevents rotation of the pin portion 48, 148. In still further embodiments, alternative male/female couples may be utilized, including those wherein the male element is disposed on the pin portion 148 and the female element is disposed within the clip portion 132, etc.

FIGS. 5-8 illustrate how the components of a fastener system 30 embodiment described above may be utilized to retain a pin portion 48 and to prevent a pin portion 48 from rotation. The fastener system 30 embodiment utilized in this example is that shown in FIGS. 1 and 2, and described above.

Figure 5:
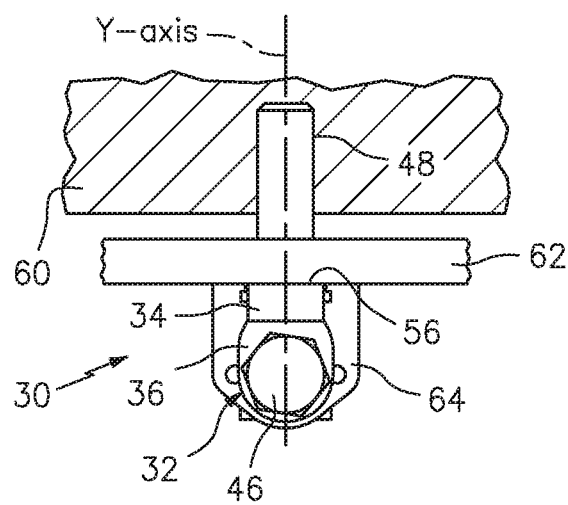
FIG. 5 is a diagrammatic top view of a fastener system embodiment mounted to a static structure.
Figure 5A:
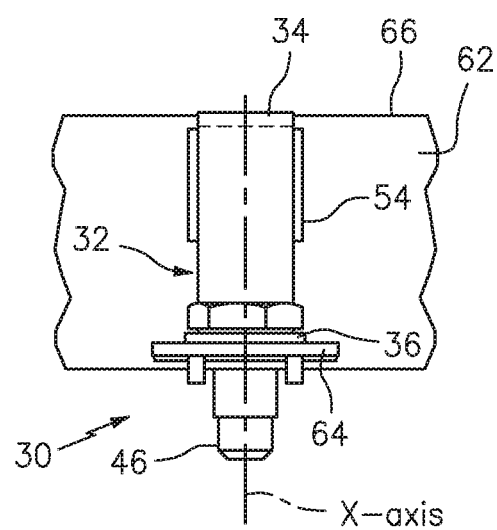
FIG. 5A is a diagrammatic front view of the fastener system embodiment shown in FIG. 5.

FIG. 5 is a diagrammatic top view of the fastener system 30 embodiment installed relative to a structure having a first portion 62 and a second portion 64 (e.g., where the first portion 62 is a planar member and the second portion 64 is a flange extending outwardly from the first portion 62). FIG. 5A is a diagrammatic front view of the fastener system 30 embodiment shown in FIG. 5. In these views, the pin portion 48 of the fastener system 30 extends through the first portion 62 of the structure (e.g., along a Y-axis) and is engaged with a component 60. A bolt 46 (or other fastener; e.g., extending along an X-axis perpendicular to the Y-axis) is used to attach the clip portion retainer flange 36 to the second portion 62 of the structure. The present disclosure is not, however, limited to fasteners extending along an X-axis perpendicular to the Y-axis; e.g., in an alternative configuration, the fastener/bolt 46 may be in a non-parallel orientation relative to the Y-axis. The bolt 46 axis is substantially parallel to the length of the clip portion connecting member 38. The head 54 of the pin portion 48 is disposed in proximity to the first portion 62 of the structure, and is engaged with the head engagement flange 34 of the clip portion 32. The engagement between the pin portion head 54 (e.g., surface 52) and the clip portion head engagement flange 34 (e.g., surface 50) prevents rotation of the pin portion 48. The head engagement flange 34 is also disposed adjacent the first portion 62 of the structure and is configured to prevent rotation of the clip portion 32 relative to the first portion 62 of the structure; e.g., the second surface 56 of the head engagement flange 34 is disposed in close proximity to the first portion 62 of the structure and therefore prevents relative rotation.

Figure 6:
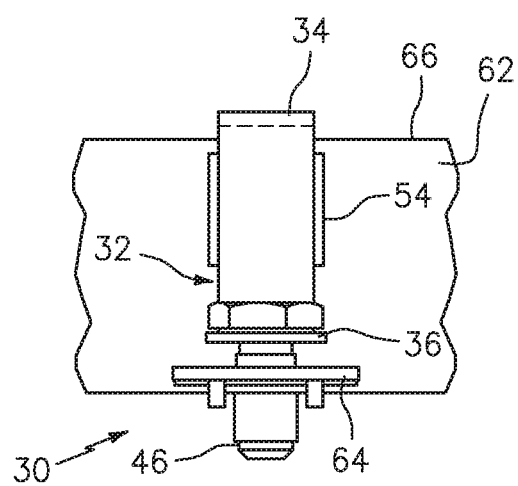
FIG. 6 is a diagrammatic front view of the fastener system embodiment shown in FIG. 5, with the bolt unscrewed an amount and the clip portion elevated relative to the static structure flange.

FIG. 6 is a diagrammatic front view of the fastener system 30 embodiment shown in FIG. 5, with the bolt 46 unscrewed an amount and the clip portion 32 elevated relative to the second portion 64 of the structure. In FIG. 6, the head engagement flange 34 is disposed above a top surface 66 of the first portion 62 of the structure. As a result, the head engagement flange 34 is no longer adjacent the first portion 62 of the structure and is free to rotate.

Figure 7:
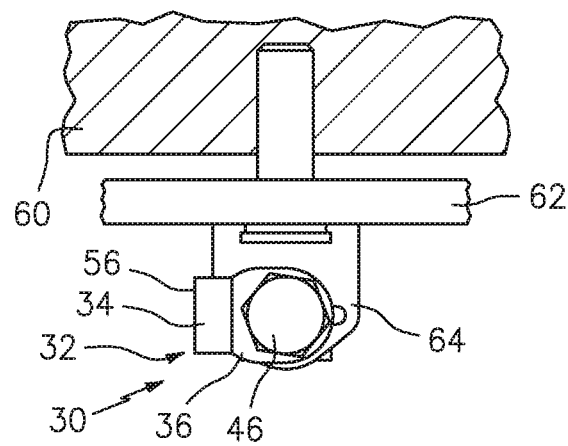
FIG. 7 is a diagrammatic top view of the fastener system embodiment shown in FIG. 5, with the clip portion rotated counterclockwise relative to the static structure.
Figure 7A:
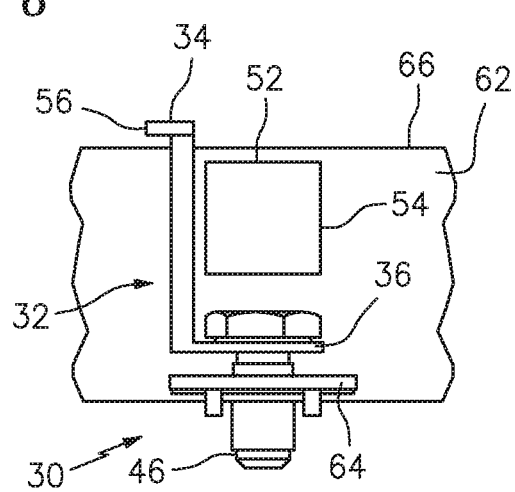
FIG. 7A is a diagrammatic front view of the fastener system embodiment shown in FIG. 7.

FIG. 7 is a diagrammatic top view of the fastener system 30 embodiment installed relative to the structure, with the clip portion 32 rotated counterclockwise relative to the first portion 62 of the structure. FIG. 7A is a diagrammatic front view of the fastener system 30 embodiment shown in FIG. 7. In these views, the pin portion 48 of the fastener system 30 remains extended through the first portion 62 of the structure. The bolt 46 is unscrewed an amount sufficient to allow elevation and counter clockwise rotation (or conversely clockwise rotation) of the clip portion 32. In this clip portion 32 position, the clip portion 32 is no longer engaged with the pin portion 48, and the pin portion 48 is accessible and can be withdrawn from the first portion 62 of the structure.

Figure 8:
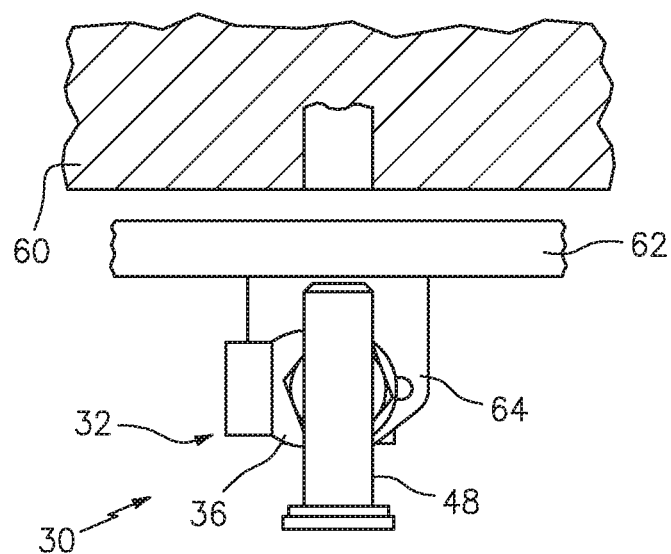
FIG. 8 is a diagrammatic top view of the fastener system embodiment shown in FIG. 5, with the clip portion rotated counterclockwise as shown in FIGS. 7 and 7A.

FIG. 8 is a diagrammatic top view of the fastener system 30 embodiment shown in FIG. 5, with the clip portion 32 rotated counterclockwise as shown in FIGS. 7 and 7A, and the pin portion 48 is withdrawn from the first portion 62 of the structure. Once the pin portion 48 is withdrawn, the component 60 can be removed.

If the R&R procedure includes replacing the component 60 with a repaired component or a replacement component, the procedure described above can be reversed in order.

The procedure may also be applied to an alternative fastener system 30 like that described above and shown in FIGS. 3 and 4. In that embodiment, the bolt 46 (or other fastener) can be unscrewed (or otherwise disengaged) a sufficient amount to permit the head engagement flange 134 (i.e., the male element of the male/female couple) to disengage with the slot (i.e., the female element) disposed within the head 154 of the pin portion 148.

In the example embodiment described above with respect to FIGS. 5-8, the fastener system 30 is configured for use with a structure having first portion 62 with a top surface 66; i.e., the clip portion 32 is configured so that it may be moved relative to the top surface 66 of the first portion 62 of the structure, and subsequently rotated to permit access to the pin portion 48.

Figure 9:
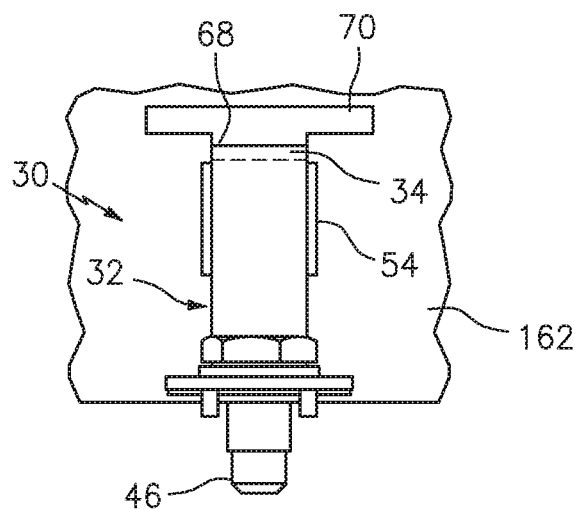
FIG. 9 is a diagrammatic front view of a fastener system embodiment mounted to a structure.
Figure 10:
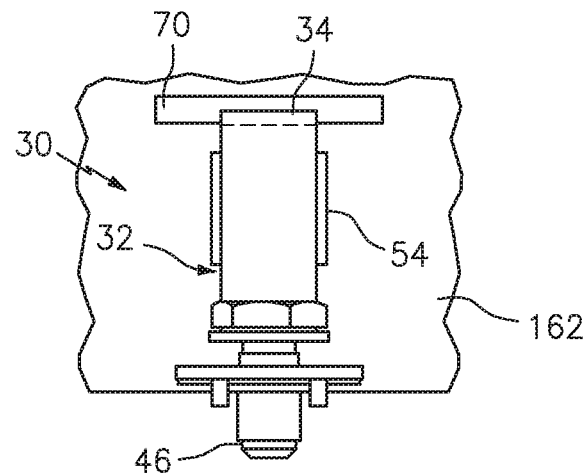
FIG. 10 is a diagrammatic front view of the fastener system embodiment shown in FIG. 9, with the bolt unscrewed an amount and the clip portion elevated relative to a portion of the structure.
Figure 11:
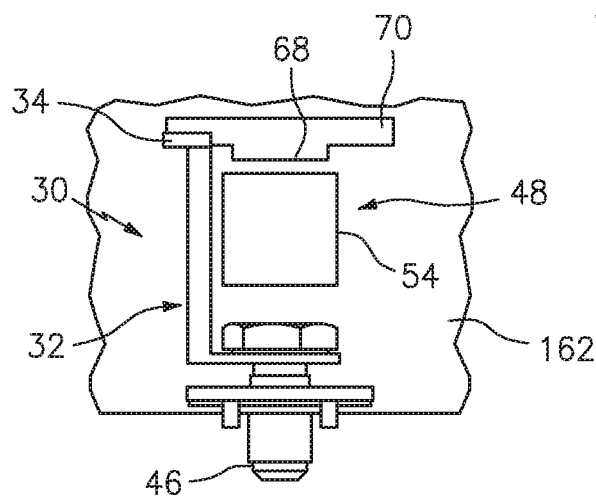
FIG. 11 is a diagrammatic top view of the fastener system embodiment shown in FIG. 9, with the clip portion rotated relative to the structure.

In some applications the first portion 62 of the structure may not include a top surface 66 adjacent the fastener system 30. In these applications, alternative embodiments of the present fastener system 30 (including a modified static structure) may be utilized. For example, in FIGS. 9-11, the first portion 162 of the structure includes a T-shaped slot having a lower slot portion 68 and an upper slot portion 70. FIG. 9 illustrates a fastener system 30 embodiment installed relative to the structure. In the installed position, the head engagement flange 34 of the clip portion 32 is received in the lower slot portion 68 and is engaged with the pin portion head 54. In this position, the head engagement flange 34 prevents rotation of the pin portion 48, and the lower slot portion 68 of the T-shaped slot prevents rotation of the clip portion 32 relative to the first portion 162 of the structure. FIG. 10 shows the fastener system 30 embodiment shown in FIG. 9 with the bolt 46 unscrewed and the clip portion 32 elevated an amount such that the head engagement flange 34 is now aligned with the upper slot portion 70 and is no longer prevented from rotation. In FIG. 11, the clip portion 32 is rotated counterclockwise (or clockwise) relative to the first portion 162 of the structure, the clip portion 32 is no longer engaged with the pin portion 48, and the pin portion 48 is accessible and can be withdrawn from the first portion 162 of the structure. The embodiment shown in FIGS. 9-11 is an example of an alternative support structure engagement configuration, and the present disclosure is not limited thereto. As a further non-limiting example, the structure may have an elongated slot or pocket rather than a T-shaped slot as shown in FIGS. 9-11. When the clip portion 32 is disposed in an elevated position, the elongated slot or pocket is configured to allow the head engagement flange 34 to rotate there through, and thereby enable the clip portion 32 to rotate to provide access to the pin portion 48.

Figure 12:
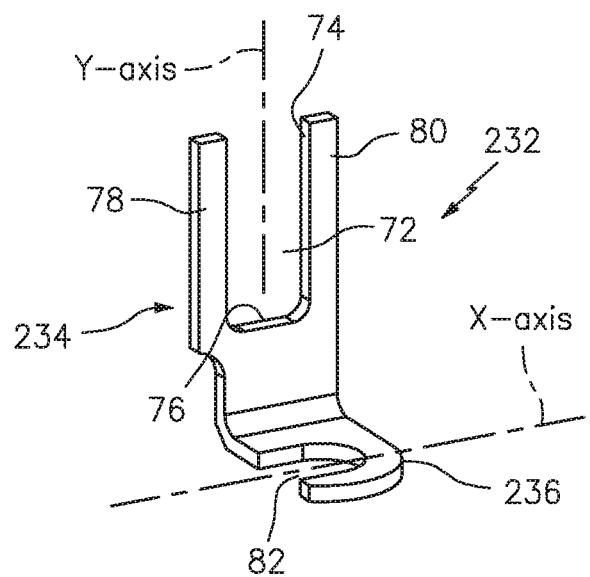
FIG. 12 is a diagrammatic illustration of a clip portion embodiment.
Figure 13:
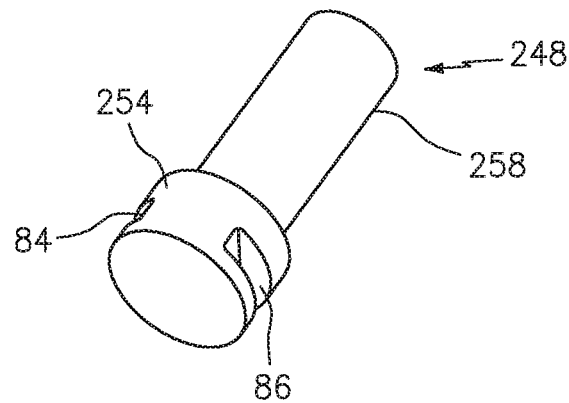
FIG. 13 is a diagrammatic perspective view of a pin portion embodiment.
Figure 14:
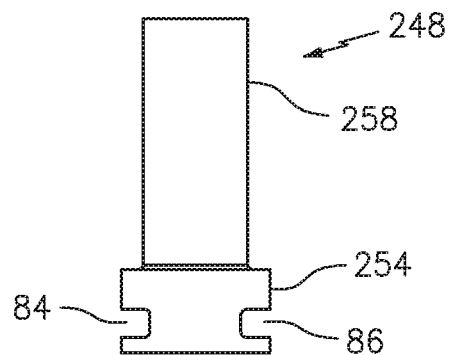
FIG. 14 is a diagrammatic planar view of the pin portion embodiment shown in FIG. 13.

FIGS. 12-21 illustrate a second embodiment of the present fastener system 30. The clip portion 232 includes head engagement flange 234 and a retainer flange 236. The head engagement flange 234 includes a lengthwise extending pin slot 72 having a first end 74 and a second end 76; i.e., a pin slot 72 disposed between a first finger portion 78 of the flange 234 and a second finger portion 80 of the flange 234. In FIG. 12 the first end 74 of the pin slot 72 is shown as an open end and the second end 76 is shown as a closed end. The retainer flange 236 is disposed at a lengthwise end of the head engagement flange 234 adjacent the second end 76 of the pin slot 72 (i.e., the closed end of the pin slot 72 as shown in FIG. 12). In the embodiment shown in FIG. 12, the retainer flange 236 extends laterally outward from the head engagement flange 234; e.g., substantially perpendicular to the head engagement flange 234. The present disclosure is not, however, limited to this particular configuration. The retainer flange 236 is configured for attachment to a structure; e.g., the retainer flange 236 includes a fastener slot 82 configured to receive a fastener 46 for securing the clip portion 232 to the structure. The fastener slot 82 is configured to receive a fastener 46 that extends along an axis 83 (see FIG. 19); e.g., an axis 83 that is substantially parallel to the length of the head engagement flange 234. In the embodiment shown in FIG. 12, the fastener slot 82 and the pin slot 72 extend along different orthogonal axes; e.g., the pin slot 72 extends along a Y-axis and the fastener slot 82 extends along an X-axis. The present disclosure is not, however, limited to this particular orthogonal orientation of the fastener slot 82 and the pin slot 71; e.g., in an alternative configuration, the fastener slot 82 and the pin slot 72 may be in a non-parallel orientation other than perpendicular. As will be described in more detail below, the head engagement flange 234 is configured to mate with the pin portion 248 such that when the fastener system 30 is installed, the head engagement flange 234 engages the pin portion 238 and prevents rotation of the pin portion 248.

The pin portion 248 of this embodiment (See FIGS. 13 and 14) includes a head 254 disposed at one end of a shaft 258. The head 254 is larger than the diameter of the shaft 258. In the embodiment shown in FIGS. 13 and 14, the head 254 is circular and has a larger diameter than the shaft 258. The pin portion 248 includes a first clip slot 84 disposed on a first side of the pin portion head 254, and a second clip slot 86 disposed on a second side of the pin portion head 254, opposite the first side. Each clip slot 84, 86 is configured to receive a portion of the head engagement clip 234 as will be described below. The pin shaft 258 is configured to be received within a structure for engagement with a component 60 (or hardware attached thereto) for mounting purposes. In the embodiment shown in FIGS. 13 and 14, the shaft 258 is shown as a cylindrical shaft, but the present disclosure is not limited to a shaft 258 having a cylindrical configuration. The head 254 is configured to mate with the head engagement flange 234 such that when the fastener system 30 is installed, the head engagement flange 234 is engaged with the pin head 254 and prevents rotation of the pin portion 248; e.g., a portion of the first finger 78 is received within the first clip slot 84 and a portion of the second finger 80 is received within the second clip slot 86.

Figure 15:
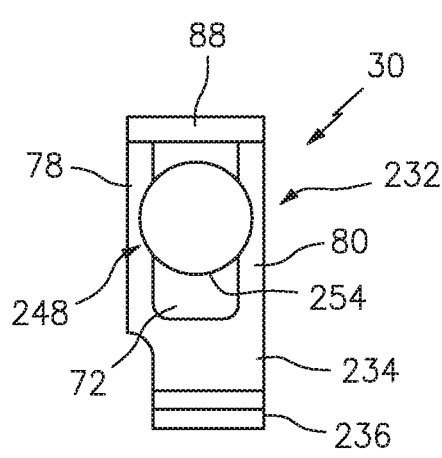
FIG. 15 is a diagrammatic view of a pin portion retained within a clip portion embodiment.

In some embodiments of the fastener system 30 second embodiment, the clip portion 232 may be configured to retain the pin portion 248 within the pin slot 72. While retained, the clip portion 232 may be translatable relative to the pin portion 248 (or vice versa), but the two remain engaged with one another. In FIG. 15, for example, a cap element 88 is attached (e.g., welded) to the head engagement flange 234 to close the pin slot 72 once the pin portion 248 is received within the pin slot 72.

Figure 16:
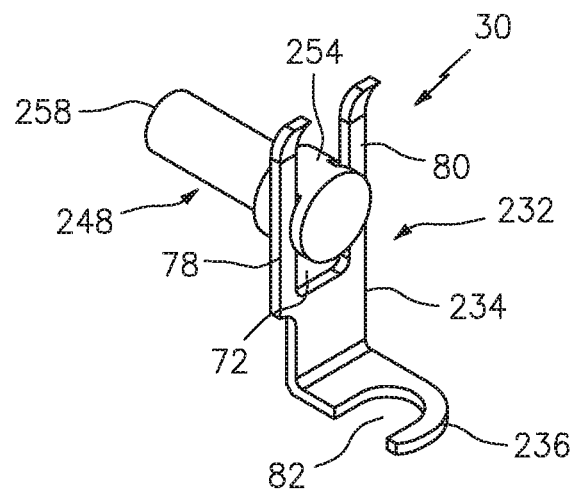
FIG. 16 is a diagrammatic view of a pin portion retained within a clip portion embodiment.
Figure 17:
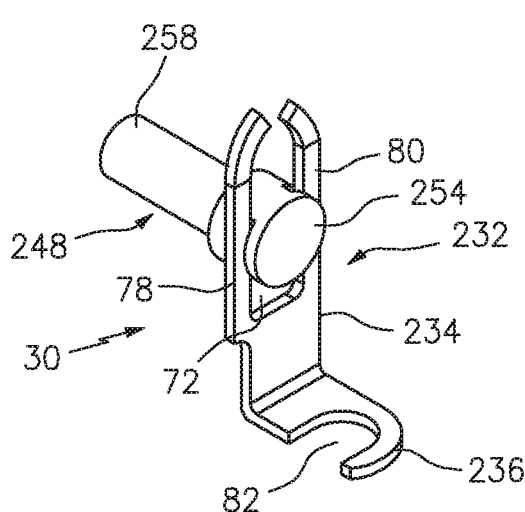
FIG. 17 is a diagrammatic view of a pin portion retained within a clip portion embodiment.

FIGS. 16 and 17 illustrate two alternative clip portions 232, each configured to retain the pin portion 248. Once the pin portion 248 is received within the pin slot 72, the distal ends of the fingers 78, 80 are deformed (e.g., in the embodiment shown in FIG. 16, the distal end of each finger 78, 80 is bent in a lateral direction; in the embodiment shown in FIG. 17, the distal end of each finger 78, 80 is bent toward the other finger) to prevent removal of the pin 248 from the pin slot 72.

Figure 18:
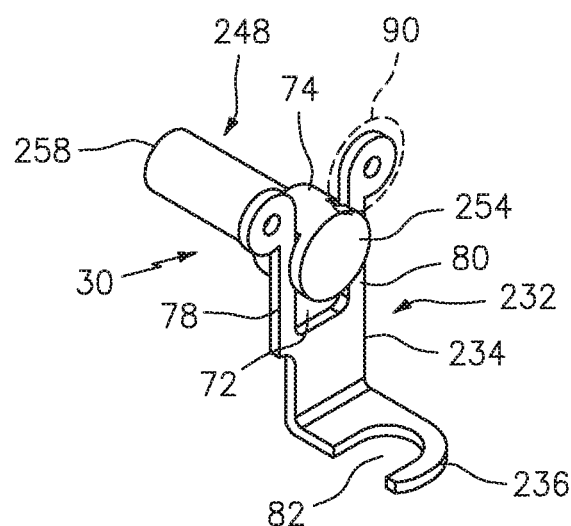
FIG. 18 is a diagrammatic view of a pin portion retained within a clip portion embodiment.

FIG. 18 illustrates yet another alternative clip portion 232 configured to retain the pin portion 248. In this embodiment, the distal end of each finger 78, 80 is configured to receive a fastener 90 (e.g., a rivet, or the like; i.e., an "obstructing" fastener). Once the pin 248 is received within the pin slot 72, a fastener 90 is attached to the distal end of each fingers 78, 80. The fastener 90 is configured to extend into the open end 74 of the pin slot 72 and thereby prevent removal of the pin 248 from the pin slot 72.

Figure 19:
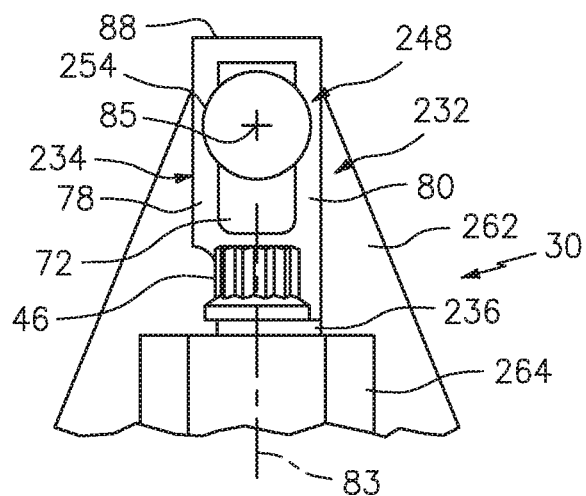
FIG. 19 is a diagrammatic front view of an embodiment of the fastener system mounted to a structure.
Figure 20:
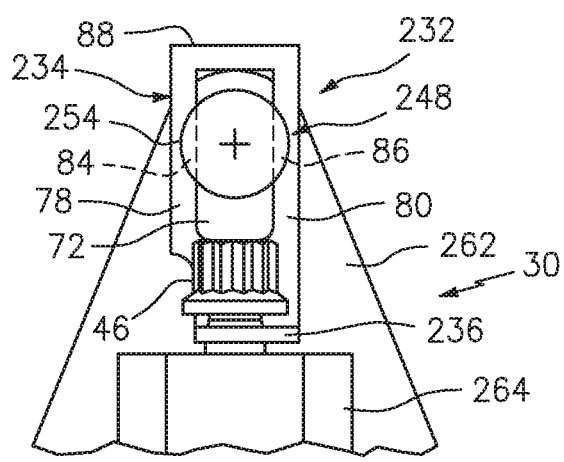
FIG. 20 is a diagrammatic front view of the fastener system embodiment shown in FIG. 19, with a bolt unscrewed an amount and a clip portion elevated relative to a portion of the structure.
Figure 21:
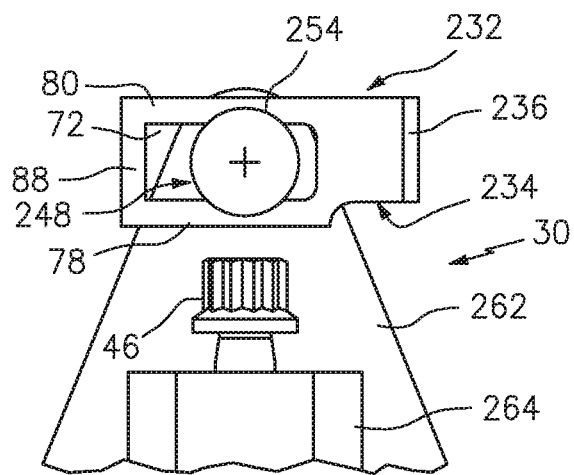
FIG. 21 is a diagrammatic front view of the fastener system embodiment shown in FIG. 19, with a clip portion rotated relative to the structure.

FIGS. 19-21 illustrate how the components of the fastener system 30 second embodiment described above may be utilized operate to retain a pin portion 248 and to prevent a pin portion 248 from rotation.

FIG. 19 is a diagrammatic front view of the fastener system 30 second embodiment installed relative to a structure. In this view, the pin portion shaft 258 (not shown) of the fastener system 30 extends through the first portion 262 of the structure (e.g., along a Y-axis 85 extending into the page in FIG. 19) for direct or indirect engagement with a component 60. A bolt 46 (or other fastener; extending along an X-axis 83 perpendicular to the Y-axis 85) is used to attach the clip portion retainer flange 236 to the second portion 264 of the structure. The bolt axis (i.e., the X-axis 83) is substantially parallel to the length of the head engagement flange 234. The present disclosure is not, however, limited to this particular configuration; e.g., in an alternative configuration, the bolt 46 and the pin portion shaft 258 may be in a non-parallel orientation relative to one another other than perpendicular. The head 254 of the pin portion 248 is engaged with the head engagement flange 234 of the clip portion 232; e.g., at least a portion of the first finger 78 is received within the first clip slot 84 and at least a portion of the second finger 80 is received within the second clip slot 86. The engagement between the pin portion head 254 and the head engagement flange 234 prevents rotation of the pin portion 248.

FIG. 20 is a diagrammatic front view of the fastener system 30 second embodiment shown in FIG. 19, with the bolt 46 unscrewed an amount and the clip portion 232 elevated relative to the second portion 264 of the structure.

FIG. 21 is a diagrammatic front view of the fastener system 30 embodiment installed relative to the structure, with the clip portion 232 rotated counterclockwise (or clockwise) relative to the structure. In this view, the pin portion 248 of the fastener system 30 remains extended through the first portion 262 of the structure. The bolt 46 is unscrewed an amount sufficient to allow rotation of the clip portion 232. In this clip portion 232 position, the pin portion 248 and retained clip portion 232 can be withdrawn from the structure.

Figure 22:
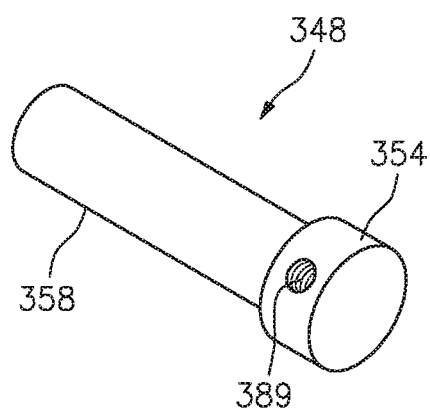
FIG. 22 is a diagrammatic illustration of a pin portion embodiment.
Figure 23:
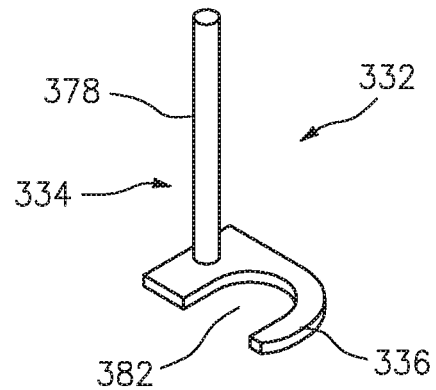
FIG. 23 is a diagrammatic illustration of a clip portion embodiment.
Figure 24:
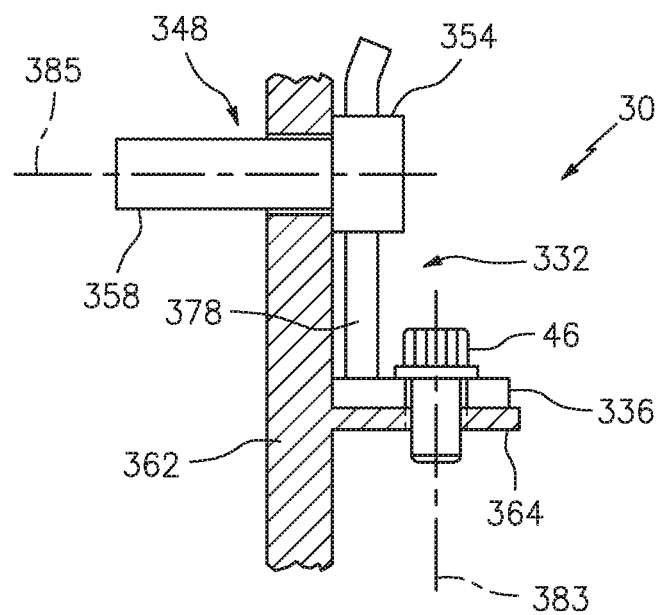
FIG. 24 is a diagrammatic front view of an embodiment of the fastener system mounted to a structure.

Referring to FIGS. 22-24, an alternative version of the second embodiment of the present fastener system 30, includes a clip portion 332 includes head engagement flange 334 and a retainer flange 336. The head engagement flange 334 includes a lengthwise extending finger 378. The retainer flange 336 is disposed at a lengthwise end of the head engagement flange 334. In the embodiment shown in FIG. 23, the retainer flange 336 extends laterally outward from the head engagement flange 334; e.g., substantially perpendicular to the head engagement flange 334. The present disclosure is not, however, limited to this particular configuration. The retainer flange 336 is configured for attachment to a structure; e.g., the retainer flange 336 includes a fastener slot 382 configured to receive a fastener 46 for securing the clip portion 332 to the structure. The fastener slot 382 is configured to receive a fastener 46.

The pin portion 348 of this embodiment (See FIG. 22) includes a head 354 disposed at one end of a shaft 358. The head 354 is larger than the diameter of the shaft 358. In the embodiment shown in FIG. 22, the head 354 is circular and has a larger diameter than the shaft 358. The pin portion head 354 includes an aperture 389 that extends through the head 354. The head 354 is configured to receive the finger 378 of the clip portion 332. The pin shaft 358 is configured to be received within a structure for engagement with a component 60 (or hardware attached thereto) for mounting purposes. In the embodiment shown in FIG. 22, the shaft 358 is shown as a cylindrical shaft, but the present disclosure is not limited to a shaft 358 having a cylindrical configuration. The head 354 is configured to mate with the head engagement flange 334 such that when the fastener system 30 is installed, the clip portion finger 378 is received within the pin portion head 354 and prevents rotation of the pin portion 348.

FIG. 24 is a diagrammatic side view of an alternative second embodiment of the fastener system 30 installed relative to a structure. In this view, the pin portion shaft 358 of the fastener system 30 extends through the first portion 362 of the structure (e.g., along axis 385) for direct or indirect engagement with a component. A bolt 46 (or other fastener; extending along axis 383) is used to attach the clip portion retainer flange 336 to the second portion 364 of the structure. In the exemplary embodiment shown in FIGS. 22-24, the pin portion 348 and the fastener 46 are shown as extending along perpendicular orthogonal axes 383, 385. The present disclosure is not limited to this configuration; e.g., the pin portion 348 and the fastener 46 may be oriented relative to one another along other non-parallel axes.

In the exemplary embodiment shown in FIGS. 22-24, the clip portion 332 may be configured to retain the pin portion 348. While retained, the clip portion 332 may be translatable relative to the pin portion 348 (or vice versa), but the two remain engaged with one another. In FIG. 24, for example, the distal end of the finger 378 is bent to prevent disengagement subsequent to the finger 378 being received within the aperture 389 extending through the pin portion head 354.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

While various embodiments of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A fastener system for securing a component to a structure, comprising:
   a pin portion having a head and a shaft; and
   a clip portion having a head engagement flange and a retainer flange configured to receive a fastener that extends along a first axis, the clip portion further including a connecting member with a first lengthwise end and a distal second lengthwise end, the head engagement flange attached to the connecting member adjacent the first lengthwise end, the retainer flange attached to the connecting member adjacent the second lengthwise end, the head engagement flange extending outwardly lateral from the connecting member in a first lateral direction, and the retainer flange extending outwardly lateral from the connecting member in a second lateral direction, opposite the first lateral direction;
   wherein the clip portion and the pin portion are configured for engagement with one another in an engaged position, and in the engaged position the pin portion shaft extends along a second axis non-parallel to the first axis; and
   wherein the pin portion head and the head engagement flange are configured to mate with one another in a manner that prevents relative rotation in the engaged position.

2. The fastener system of claim 1, wherein in the engaged position the pin portion shaft extends along a second axis substantially perpendicular to the first axis.

3. The system of claim 1, wherein the clip portion and the pin portion are configurable in a non-engaged position, wherein the clip portion is rotatable from a first position in the engaged position to a second position in the non-engaged position, wherein in the non-engaged position the pin portion is unrestrained by the clip portion.

4. A mounting system for attaching a component to a structure, the structure having a first portion and a second portion that extends outwardly from the first portion, the system comprising:
   a fastener;
   at least one fastener system that includes a pin portion and a clip portion, the pin portion having a head and a shaft, and the clip portion having a head engagement flange and a retainer flange configured to receive the fastener, the clip portion further including a connecting member with a first lengthwise end and a distal second lengthwise end, the head engagement flange attached to the connecting member adjacent the first lengthwise end, the retainer flange is attached to the connecting member adjacent the second lengthwise end, the head engagement flange extending outwardly lateral from the connecting member in a first lateral direction, and the retainer flange extending outwardly lateral from the connecting member in a second lateral direction, opposite the first lateral direction;

wherein the clip portion and the pin portion are configured for mounting on the structure in an engaged position;

wherein in the engaged position the fastener secures the retainer flange to the second portion of the structure, and extends along a first axis, and the pin portion shaft is received within the first portion of the structure and extends along a second axis non-parallel with the first axis, and wherein the pin portion is restrained from rotation by the clip portion.

5. The system of claim 4, wherein the second axis is substantially perpendicular to the first axis.

6. The system of claim 4, wherein the pin portion head and the head engagement flange are configured to mate with one another in a manner that prevents relative rotation in the engaged position.

7. The system of claim 6, wherein the head engagement flange is configured relative to the first portion of the structure that prevents rotation of the clip portion relative to the first portion of the structure in the engaged position.

* * * * *